US004001603B2

United States Statutory Invention Registration [19]

[11] Reg. Number: H1603

[45] Published: Nov. 5, 1996

Deckard et al.

[54] FLARE WITH SAFE-AND-ARM IGNITION SYSTEM

[75] Inventors: Dennis D. Deckard, Bedford; Stanley J. Herold, Bloomfield; Donald E. LaGrange, Washington; Dennis L. Mitchell, Coal City; David J. Mulinix, Bloomington, all of Ind.

[73] Assignee: The United States of America as represented by the Secretary of the Navy, Washington, D.C.

[21] Appl. No.: 553,233

[22] Filed: Nov. 7, 1995

[51] Int. Cl.[6] ..... F42B 4/36; F42B 12/00; F42C 15/34

[52] U.S. Cl. ..... 102/336; 102/506; 102/256

[58] Field of Search ..... 102/336, 506, 102/256

[56] References Cited

U.S. PATENT DOCUMENTS

| | | | |
|---|---|---|---|
| H453 | 4/1988 | Schmidlin | 102/221 |
| 3,392,672 | 7/1968 | Noles | 102/70 |
| 4,029,014 | 6/1977 | Cunningham | 102/222 |
| 4,483,254 | 11/1984 | Thurston et al. | 102/254 |
| 4,573,411 | 3/1986 | Liebhardt et al. | 102/256 |
| 4,599,945 | 7/1986 | Groustra et al. | 102/256 |
| 4,683,823 | 8/1987 | Dinger et al. | 102/229 |
| 4,890,556 | 1/1990 | Ottmann et al. | 102/499 |
| 5,033,383 | 7/1991 | Edminster | 102/254 |
| 5,063,847 | 11/1991 | Haissig et al. | 102/271 |

*Primary Examiner*—Peter A. Nelson

*Attorney, Agent, or Firm*—William Cecil Townsend; Edward J. Connors, Jr.

[57] ABSTRACT

An aerial flare having a safe-and-arm ignition system in which a radially movable valve element or slider is retained in a safe position obstructing ignition ports by engagement of the slider with interior walls of the flare casing. To deploy the flare, an expulsion charge is electrically detonated, ruptures a frangible barrier, ignites primer in the igniter, and expels igniter-illuminant assembly from the forward end of the casing. When the igniter clears the casing, the slider is powered radially outwardly under the force of a biasing spring to uncover the ignition ports so that the parts are in an arm position. The flaming primer then ignites the illuminant through the open ignition ports.

6 Claims, 9 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FLARE WITH SAFE-AND-ARM IGNITION SYSTEM

BACKGROUND OF THE INVENTION

This invention relates to flares having safe-and-arm ignition systems, and more particularly safe-and-arm ignition systems having blocking or interrupting mechanisms to selectively prevent or permit ignition.

Aerial flares are used for a variety of applications, including illumination, signaling, marking, decoy, and other purposes. Due to the important nature of their uses, such flares require a high degree of reliability in their ignition systems. The flares must be in a constant state of readiness, and when the flare ignition system is placed in the "arm" mode, ignition must be certain.

Nevertheless, the flare cannot be carried on a vehicle such as an aircraft in an armed mode at all times. If the flare were to be ignited before it was launched, the vehicle could be damaged or destroyed. Consequently, the flare must be capable of being carried with the ignition system in a "safe" mode in which ignition is impossible. Moreover, the ignition system must be compact, lightweight, and capable of switching from the safe to the arm mode quickly and reliably.

Many types of safe-and-arm ignition devices are known in the prior art, each having associated advantages and disadvantages. Some devices are small and simple in operation, which allows for reliable operation in the arm mode. However, the more simple the arming mechanism, the more vulnerable has been the device to accidental ignition. More complex systems reduce this disadvantage, but only at higher cost and requirements for more space. None of the prior art ignition systems provides the desired combination of high reliability and small size that would make them entirely satisfactory in terms of effective and efficient operation.

Accordingly, it is an object of the invention to provide a flare having an improved safe-and-arm ignition system that overcomes the disadvantages of the prior art.

Other objects of the invention are to provide a flare having an improved safe-and-arm ignition system that positively prohibits ignition while the flare illuminant is contained within the flare casing, and that ensures ignition immediately after the illuminant has exited the casing.

Still further objects of the invention are to provide a flare having an improved safe-and-arm ignition system that automatically switches from the safe to the arm mode, and accomplishes the foregoing objects without sacrificing space desired to be used for illuminant.

Additional objects and advantages of the invention will appear from the following detailed description which, together with the accompanying drawings, discloses a preferred embodiment of the invention for purposes of illustration only. For definition of the invention, reference will be made to the appended claims.

DETAILED DESCRIPTION OF THE PREFERRED EMBODIMENT

Figure 1:
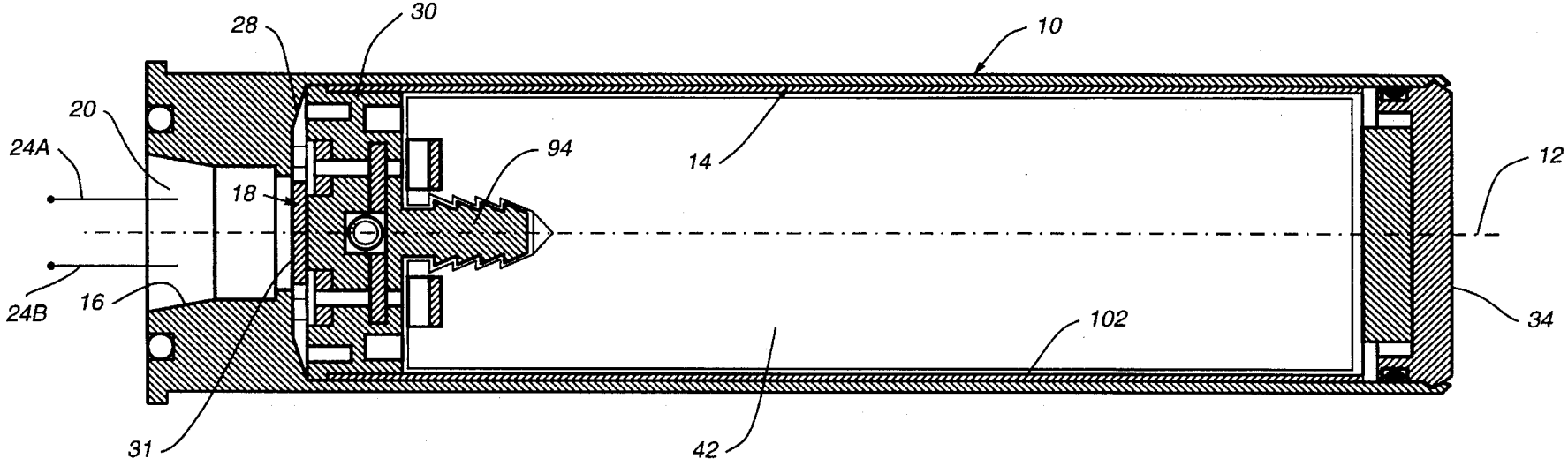
FIG. 1 is a longitudinal cross-sectional view of a flare embodying principles of the invention.

The aerial flare of FIG. 1 comprises a casing 10 containing the internal components of the flare and having a fore-and-aft axis 12. The interior surfaces of the casing define a chamber having a relatively larger fore portion 14 (see also FIG. 2) and a relatively smaller aft portion 16, which are sealed from one another by frangible barrier 18. Aft chamber portion 16 contains an expulsion charge 20 which initiates ignition and generates an explosive impulse that ruptures barrier 18 and expels the contents of fore chamber portion 14 through the forward end of the casing. Expulsion charge 20 is detonated electrically in a conventioal manner by applying a voltage across electrodes 24A, 24B which protrude from the aft end of the charge and are plugged into a suitable, conventional launcher (not shown). As will be discussed in greater detail below, activation of the expulsion charge produces flaming gases which ignite a primer carried in the flare igniter 30, after rupturing barrier 18.

Figure 2:
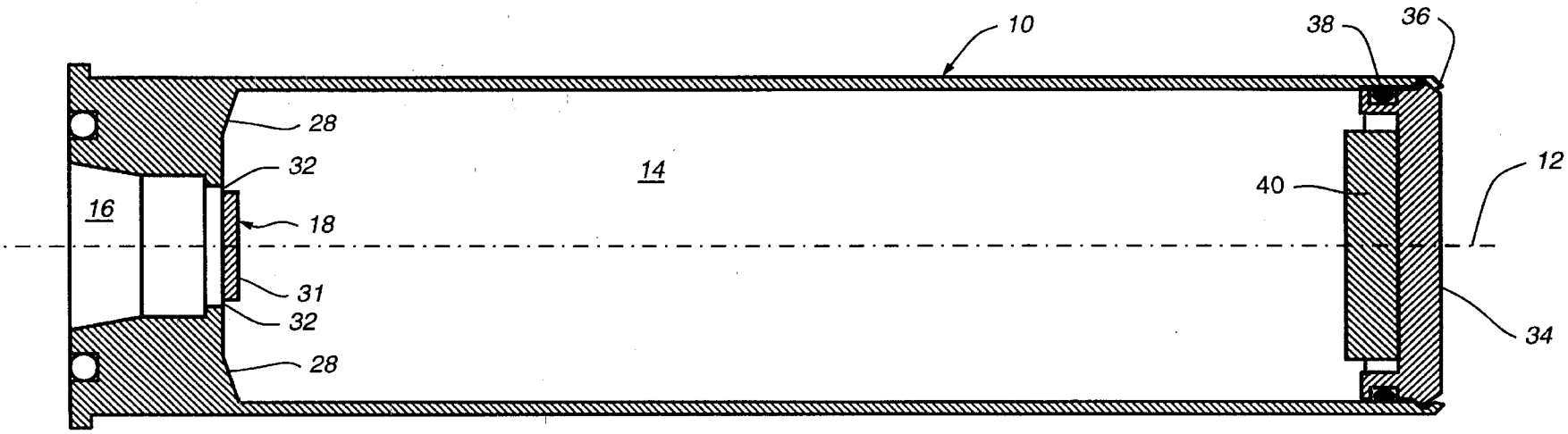
FIG. 2 is a longitudinal cross-sectional view showing details of the casing of the flare of FIG. 1.

As best shown in FIG. 2, the diameter of fore chamber portion 14 is larger than that of aft chamber portion 16, with a shoulder 28 .being formed at the juncture of the chamber portions. Barrier 18 at the juncture of the chamber portions seals fore chamber portion 14 from aft chamber portion 16. Barrier 18 comprises a button 31 that is joined to shoulder 28 by a very thin (e.g. 0.010") connecting annulus 32. Activation of expulsion charge 20 (FIG. 1), which may be of any suitable type of conventional design, ruptures the barrier at the connecting annulus, and dislodges the button from its position barricading chamber portion 14 from chamber portion 16 (see FIG. 6A).

Figure 3A:
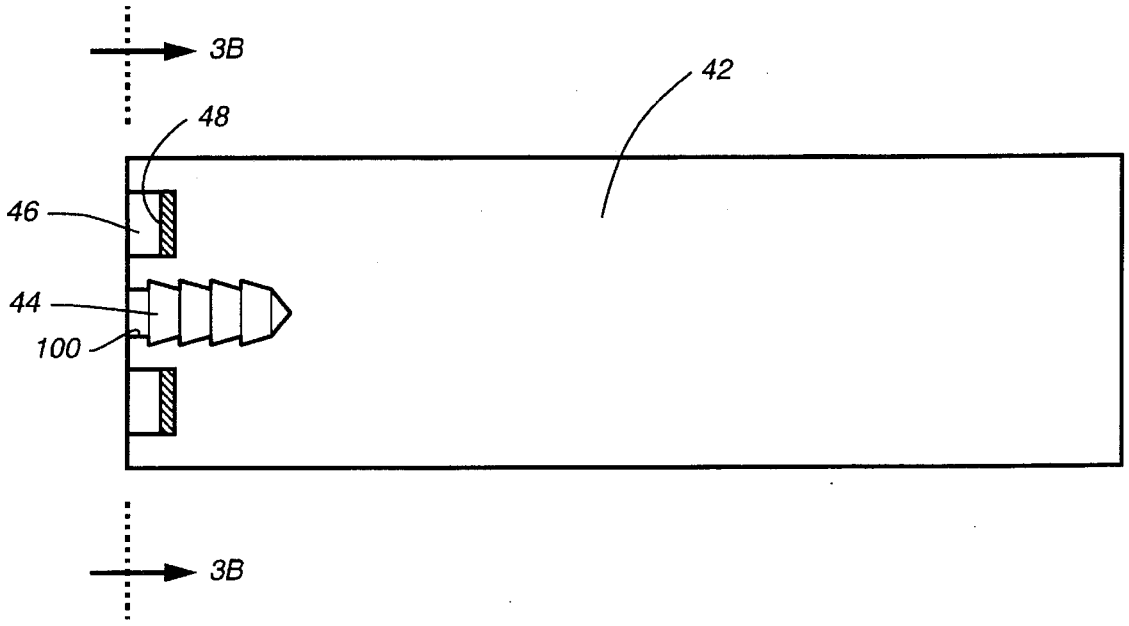
FIG. 3A is a longitudinal cross-sectional view showing details of the illuminant of the flare of FIG. 1.
Figure 3B:
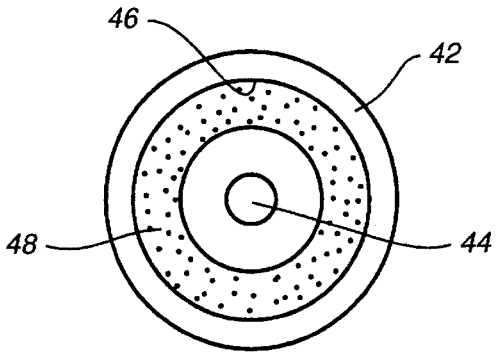
FIG. 3B is an elevational view on line 3B—3B of FIG. 3A, showing the aft end of the illuminant.

The flare grain or illuminant 42 is best shown in FIGS. 3A, 3B, and may be of any suitable, conventional type. The term "illuminant" as used herein means an emitter of radiation in the electromagnetic spectrum, and may be selected from a variety of conventional, known types on the basis of the intended use of the flare. Illuminant 42 has an axial recess 44 in its aft end, in which is embedded a barbed member 94 (FIG. 1) by which illuminant 42 is attached to igniter 30. Additionally, the aft end of illuminant 42 includes an annular groove 46 (FIGS. 3A, 3B) along which a conventional primer 48 is distributed to foster a more uniform burn of the illuminant. Igniter 30 (FIG. 1) rests against shoulder 28 when positioned in fore chamber portion 14. The igniter comprises a housing 50, detailed in FIGS. 4A–4D, for carrying the remaining components of the igniter. Housing 50 has an aft surface 52 that includes a plurality of raised separator elements or lands 54A–54F which engage shoulder 28 (FIG. 1). These raised separators prevent incidental contact between the remaining portions of aft surface 52 and barrier 18 that might rupture connecting annulus 32 and displace button 31 prematurely, i. e., before the activation of the expulsion charge.

Figure 4A:
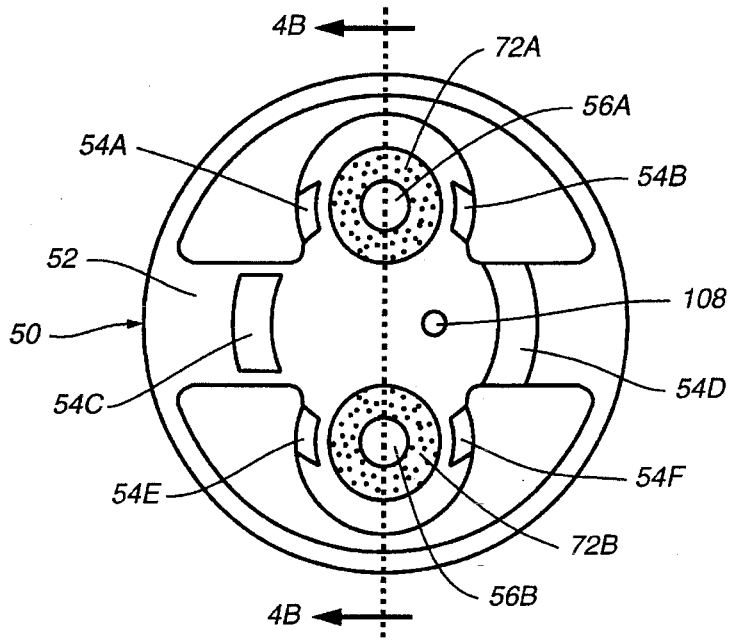
FIG. 4A is an elevational view showing the aft end of the igniter housing of the flare of FIG. 1.
Figure 4B:
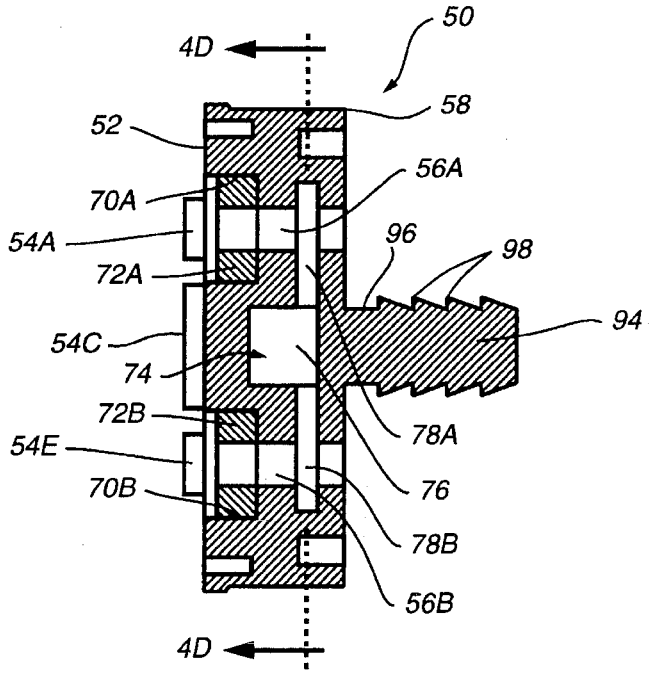
FIG. 4B is a cross-sectional view on line 4B—4B of FIG. 4A.
Figure 4C:
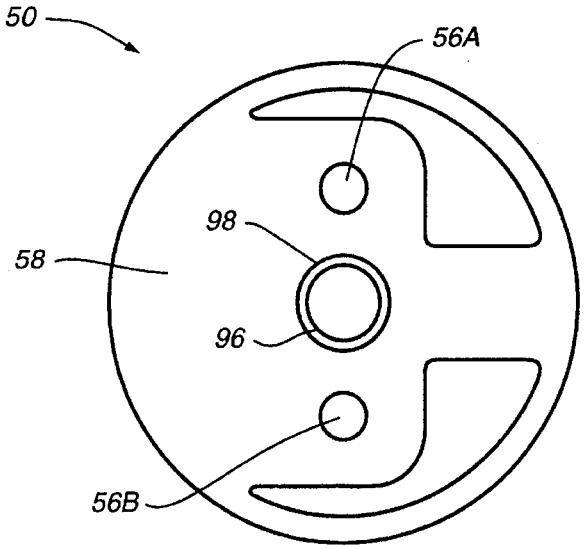
FIG. 4C is an elevational view showing the forward end of the igniter housing of FIG. 4A.
Figure 4D:
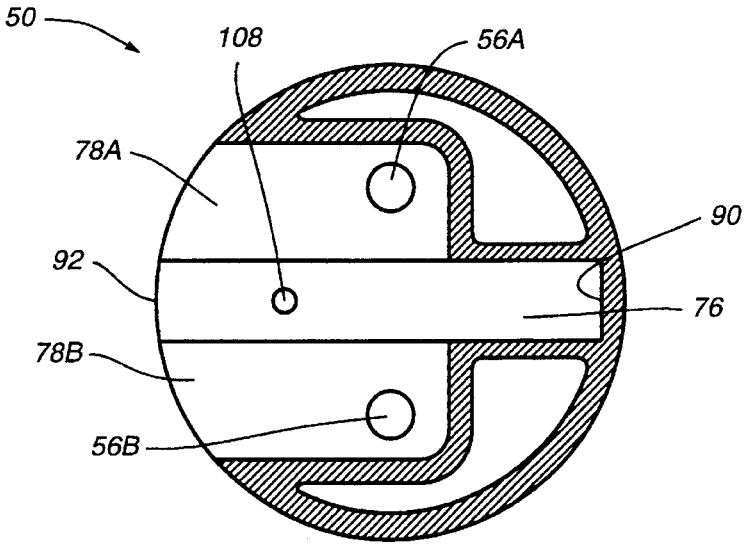
FIG. 4D is a cross-sectional view on line 4D—4D of FIG. 4B.

Two ignition ports or passages 56A, 56B (FIGS. 4A–4D) are formed in the housing and lead from aft surface 52 to fore surface 58 of the housing. As shown in FIG. 4B, near aft surface 52 each passage includes an area of enlarged diameter 70A, 70B, for receiving a conventional primer charge 72A, 72B, respectively. These primer charges are ignited by expulsion charge 20 (see FIGS. 1, 6A) and in turn ignite illluminant 42 (see FIG. 6B). The housing also includes a cavity 74 (FIG. 4B) for receiving the remaining components of the igniter. Cavity 74 may be considered as having three regions consisting of a centrally located channel 76 flanked by two slots 78A, 78B (see also FIG. 4D). The remaining components of the igniter, shown in FIGS. 7A, 7B, are a spring 80, a slidably movable valve element or slider 82, and a spacer 84 which are inserted into the cavity through its open end 92.

Figure 5A:
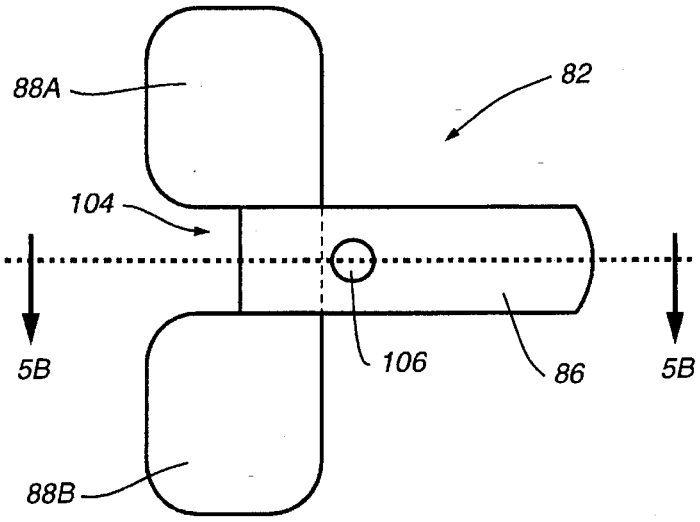
FIG. 5A is an elevational view showing the aft side of the slider component of the igniter of the flare of FIG. 1.
Figure 5B:
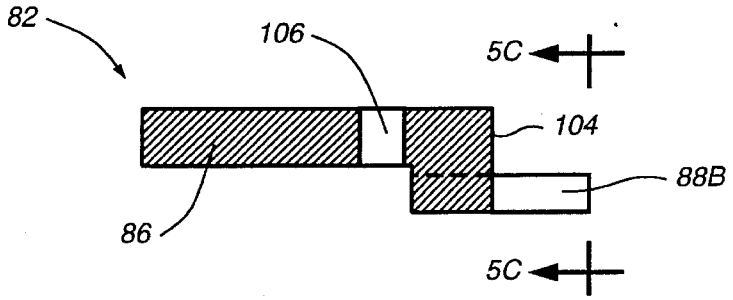
FIG. 5B is a cross-sectional view on line 5B—5B of FIG. 5A.
Figure 5C:
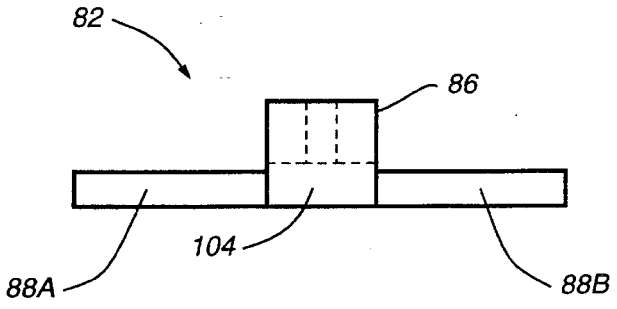
FIG. 5C is an elevational view of the slider taken on line 5C—5C of FIG. 5B.
Figure 7A:
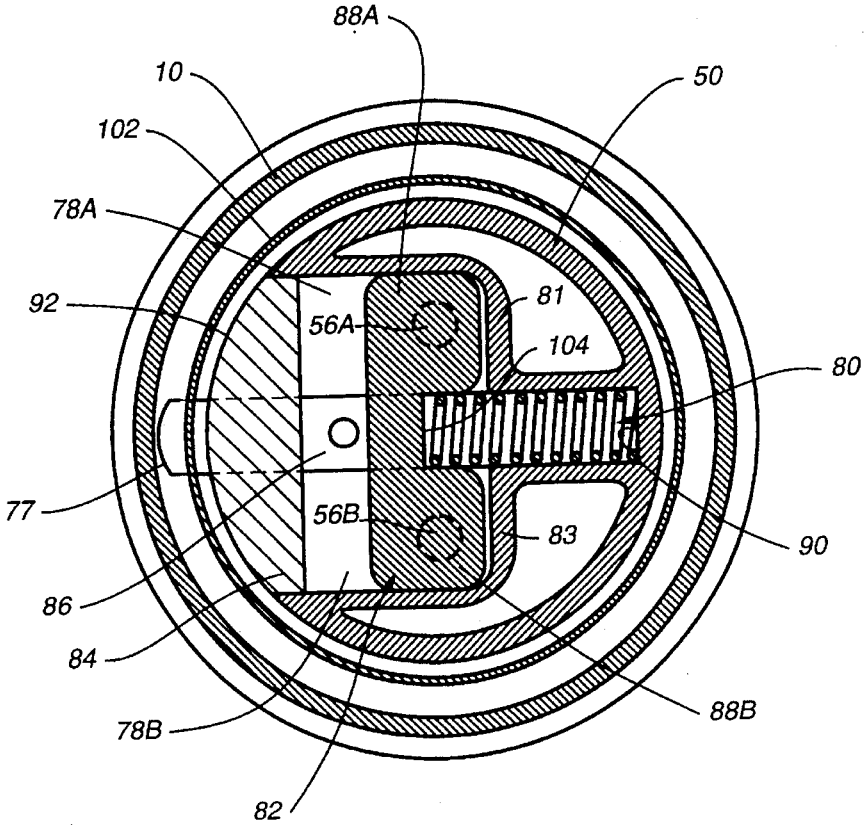
FIG. 7A is a cross-sectional view on line 7A—7A of FIG. 6A.
Figure 7B:
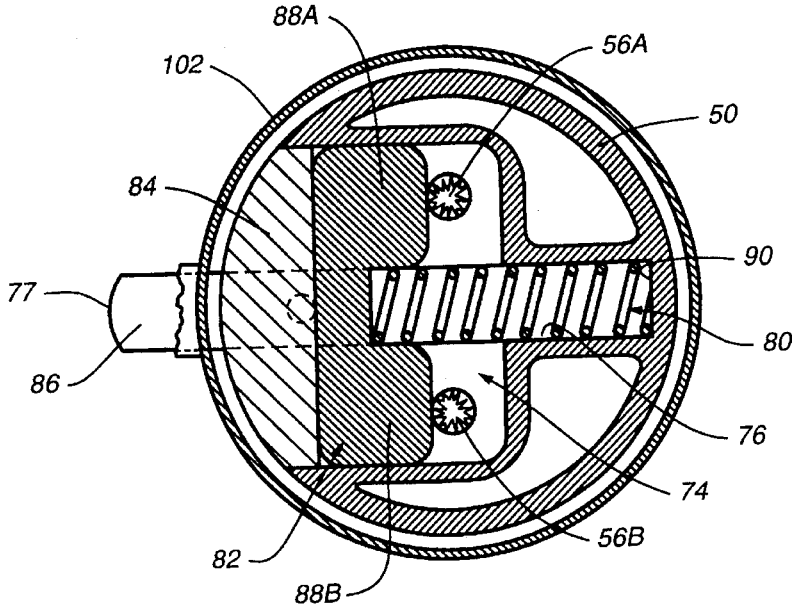
FIG. 7B is a cross-sectional view on line 7B—7B of FIG. 6B.

Spring 80 is inserted first, so that it engages closed end wall 90 of channel 76, as shown in FIGS. 7A, 7B. Next, slider 82 is inserted so that its front face 104 engages spring 80. As also shown in FIGS. 5A–5C, the slider includes a main body portion 86 with two platelike foot members 88A, 88B. As shown in FIGS. 7A, 7B, the slider fits into cavity 74 with main body portion 86 slidably received in channel 76 and foot members 88A, 88B slidably received in slots 78A, 78B, respectively (see also FIGS. 4B, 4D).

As slider 82 is pushed farther into the cavity, its front face 104 compresses spring 80. Eventually, the leading edges of the foot members are contiguous to walls 81, 83 of the cavity as shown in FIG. 7A. In this position, feet 88A, 88B block or obstruct passages 56A, 56B respectively between primer charges 72A, 72B and the fore surface of the igniter housing, which defines the "safe" position (see also FIG. 6A). It is physically impossible for primer charges 72A, 72B to ignite the illuminant while the igniter is in the safe position. When the parts are in the safe position, a hole 106 (FIGS. 5A–5B) formed in slider 82 for a set pin (not shown) is aligned with a similar hole 108 (FIGS. 4A, 4D) formed in the aft surface of the housing. Insertion of a set pin into holes 106, 108 will retain or lock the slider in the safe position during the assembly process until the igniter is loaded into the casing. The final component of the igniter, spacer 84, is positioned in open end 92 of the cavity to provide structural strength and support in a fore-and-aft direction during the expulsion procedure.

Figure 6A:
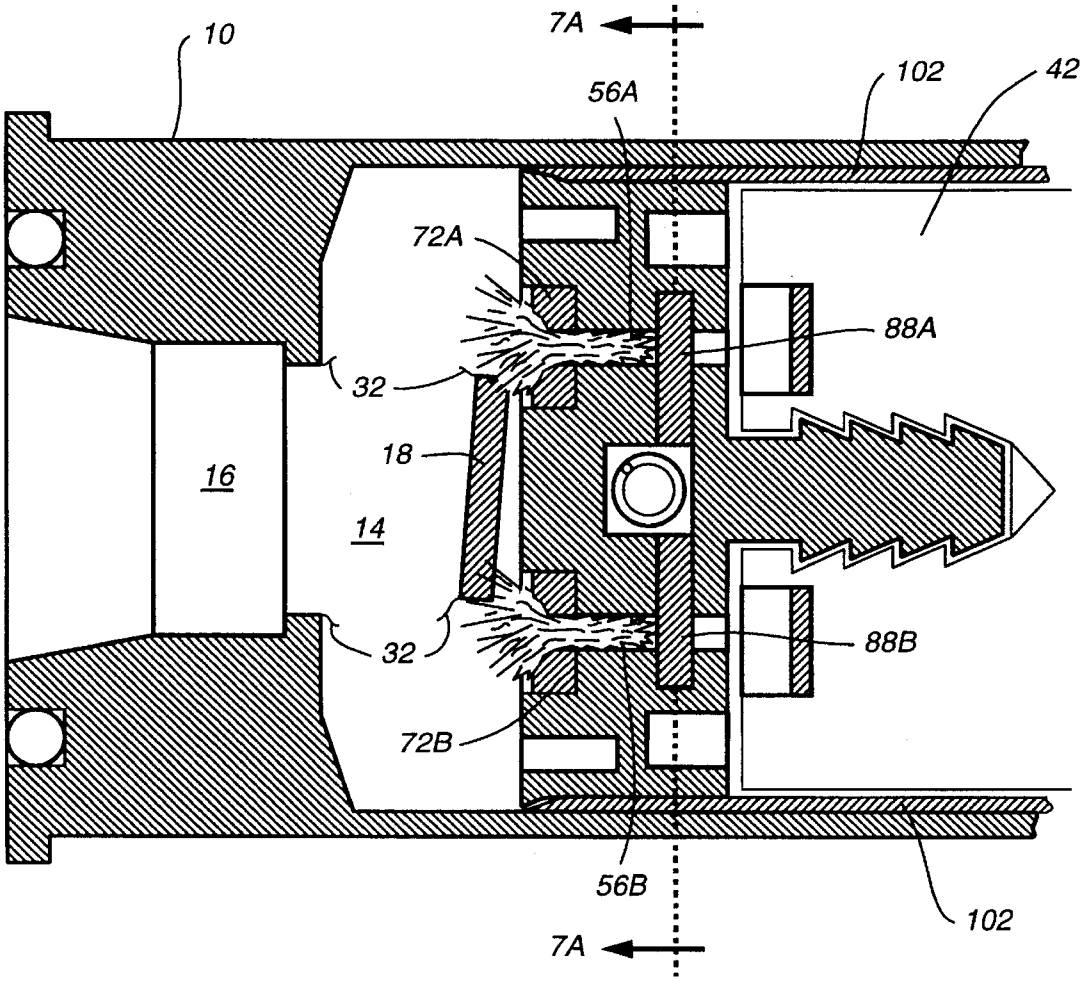
FIG. 6A is a partial longitudinal cross-sectional view of the flare of FIG. 1, showing the parts of the ignition system in the safe position shortly after ignition has been initiated, but while the igniter is still in the flare casing.
Figure 6B:
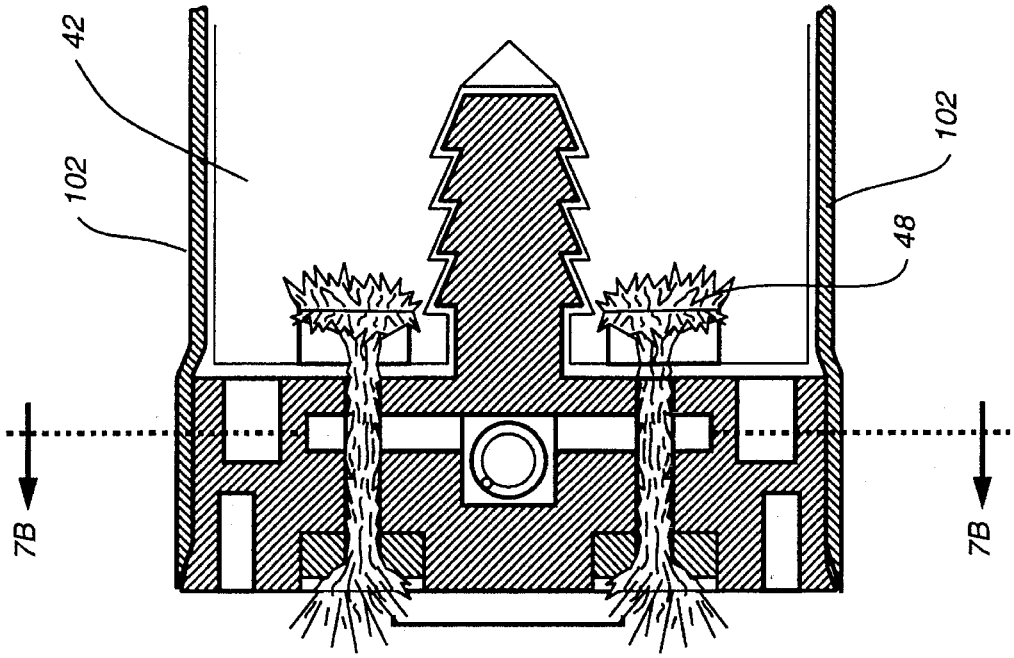
FIG. 6B shows the parts of FIG. 6A in the arm position after the igniter has been expelled from the casing.
Figure 6B:
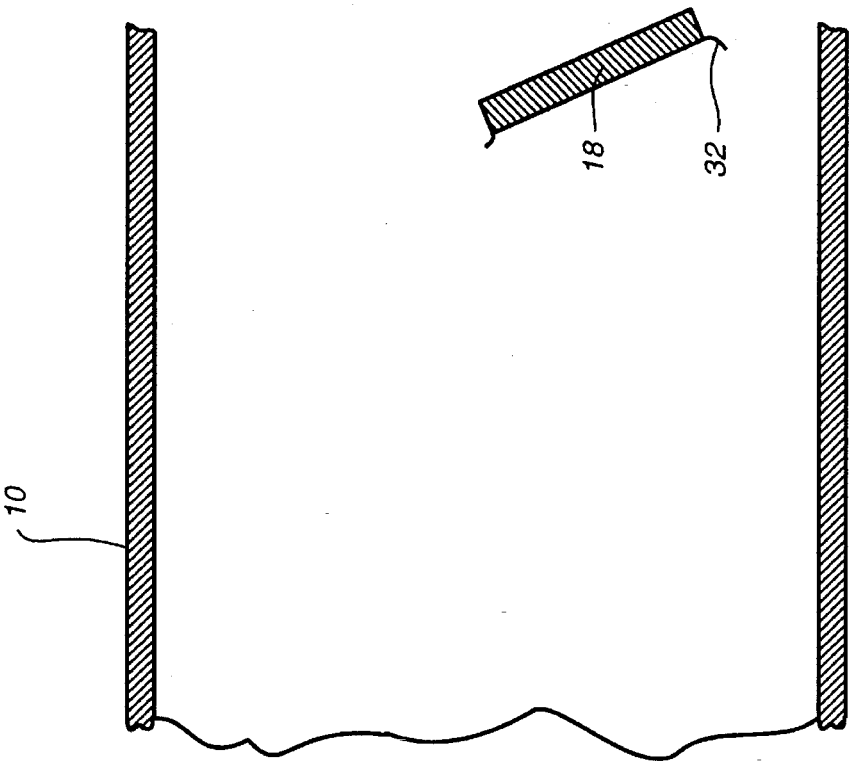

The igniter is attached to the illuminant by assembly boss 94, (FIGS. 4B, 4C) which comprises a main body portion 96 protruding forwardly from the igniter housing, and a plurality of radially outwardly projecting barbs 98 embedded in walls 100 of recess 44 (FIG. 3A) as shown in FIGS. 1, 6A, 6B. The igniter-illuminant assembly is wrapped in aluminum foil 102, as shown in FIGS. 1, 6A–B, 7A–B. The foil prevents the illuminant from being ignited by any flaming gases that blow by the periphery of the igniter during the expulsion process.

Before the foil-wrapped igniter-illuminant assembly is loaded into the casing, the set pin is removed from holes 106, 108 in the slider and housing, respectively. However, care must be taken to manually restrain the slider in the safe position against the stored energy of the compressed spring until the igniter is placed in the casing a distance sufficient for the interior walls of the casing to engage and restrain the slider in the safe position (see FIG. 7A). If the radially outer end portion 77 of the main body of the slider protrudes substantially beyond the envelope of the igniter housing (see FIG. 7B), it will prevent the igniter from being inserted into the casing. Thus, the flare according to the invention can be assembled only when the parts are in the safe position, which is a further safety feature of the invention.

Once loaded into the casing, the spring biases the main body of the slider radially outwardly so that the outer end 77 of body portion 86 of the slider engages the internal surface of the casing, as shown in FIG. 7A. This maintains the parts in the safe position as long as the igniter is in the casing. As shown in FIGS. 1 and 2, a breakaway end cap 34 is affixed to the forward end of casing 10 by a crimp 36 in the casing. End cap 34 has an O-ring 38 for sealing the chamber against moisture and other contaminants, and a foam pad 40 which fills any void that may exist between the illuminant and the end cap as a result of manufacturing tolerances of the individual components.

Flares made in accordance with the invention, with the igniter in the safe mode, can be safely transported and affixed to a launcher on the vehicle. In operation, the flare is deployed by applying voltage across electrodes 24A, 24B (FIG. 1) of expulsion charge 20 which ignites, producing flaming gases in an explosive impulse. These gases rupture barrier 18 at connecting annulus 32 and dislodge button 31 (see also FIG. 6A). Once the barrier is ruptured, the flaming gases enter fore chamber portion 14, ignite primer charges 72A, 72B, and force the foil-wrapped igniter-illuminant assembly forward in the chamber to dislodge end cap 34. While the igniter slides toward the forward end of the casing, the casing is retained on the launcher on the aircraft and the interior surface of the casing maintains the slider in the safe position (FIGS. 6A, 7A) thereby preventing the flaming primer charges from igniting the illuminant through passages 56A, 56B that are obstructed by the foot members of the slider.

However, when the igniter is expelled from the fore chamber portion of the casing (FIG. 6B), the interior walls of the casing no longer engage and restrain slider 82. When thus freed from restraint, the stored energy of the spring powers the slider radially outwardly to the arm position (see also FIG. 7B). In moving to the arm position, end portion 77 of the slider passes through foil wrap 102 and a slit may be preformed in the wrap to facilitate this action. In the arm position, the foot members have been displaced to uncover passages 56A, 56B which are now unobstructed and open for flaming primer charges 72A, 72B to ignite the illuminant through the passages and the medium of primer charge 48.

We claim:

1. An aerial flare, comprising a casing having a fore-and-aft axis and having internal surfaces defining a chamber having a fore portion and an aft portion, an igniter disposed in the chamber and slidable in a direction along the fore-and-aft axis of the casing, a mass of illuminant disposed in the chamber forward of the igniter and slidable in a direction along the fore-and-aft axis of the casing, means for attaching the igniter to the illuminant, expulsion charge means in the aft portion of the chamber for expelling the igniter and the illuminant from the chamber, the igniter including a housing having passage means communicating between the aft portion of the chamber and the fore portion of the chamber, primer means for igniting the illuminant, the primer means being disposed in the passage means for ignition by the expulsion charge means, blocking means mounted on the housing for movement in a direction transverse to the fore-and-aft axis between a safe position in which the blocking means blocks the passage means between the primer means and the illuminant, and an arm position in which the blocking means is displaced from blocking the passage means and exposes the illuminant for ignition by the primer means through the passage means, and biasing means operably associated with the housing and the blocking means for biasing the blocking means toward the arm position and into engagement with an internal surface of the casing which restrains the blocking means in the safe position while the igniter is within the casing, and breakaway closure means for sealing the illuminant and igniter in the chamber until broken away by expulsion of the illuminant and igniter by the expulsion charge means.

2. The flare of claim 1, in which the blocking means is mounted on the housing by guide means defining a cavity in the housing for slidably receiving the blocking means, and the biasing means powers the blocking means into the arm position when the blocking means is freed from restraint by the internal surfaces of the casing upon expulsion of the igniter from the chamber.

3. The flare of claim 1, in which the means for attaching the igniter to the illuminant includes a base portion carried by the housing and a forwardly extending barbed portion embedded in the illuminant.

4. The flare of claim 1, including sheathing means covering the mass of illuminant for insulating the illuminant from ignition by blowby around the igniter from the expulsion charge means.

5. The flare of claim 1, including frangible means forming a barrier between the expulsion charge means and the primer means until ruptured by activation of the expulsion charge means.

6. The flare of claim 1, in which the biasing means includes a spring.

* * * * *